(Model.) 3 Sheets—Sheet 1.

A. F. VALLOTTON & H. LEGUAY.
STEAM ENGINE.

No. 258,617. Patented May 30, 1882.

Attest.
Charles Pickles
Ed. A. Thielens

Inventors
Albert F. Vallotton
Henry Leguay
by Chas. D. Moody
atty.

(Model.) 3 Sheets—Sheet 2.

A. F. VALLOTTON & H. LEGUAY.
STEAM ENGINE.

No. 258,617. Patented May 30, 1882.

Attest.
Charles Pickles
B. A. Thielens

Inventors
Albert F. Vallotton
Henry Leguay
by Chas. D. Moody
atty.

(Model.)
3 Sheets—Sheet 3.
A. F. VALLOTTON & H. LEGUAY.
STEAM ENGINE.
No. 258,617. Patented May 30, 1882.
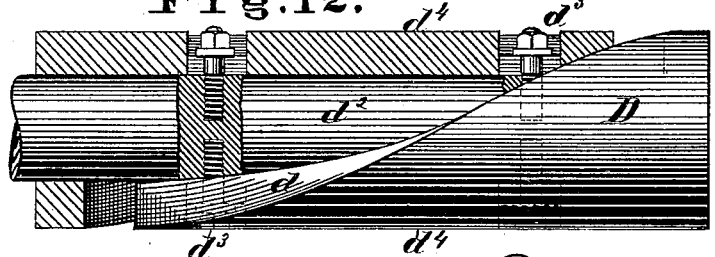
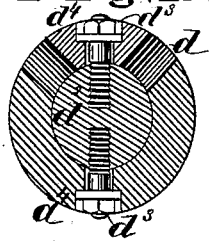
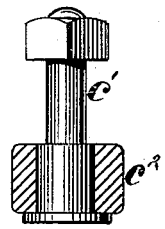
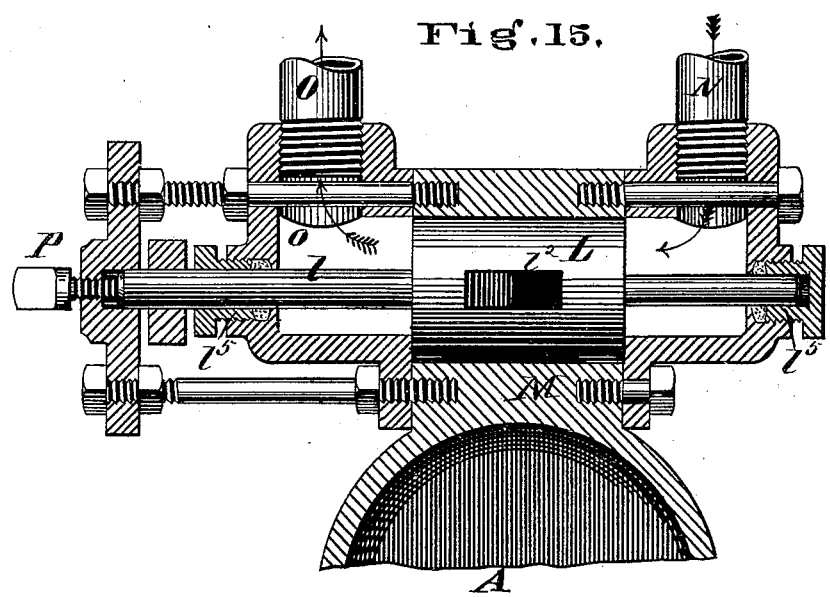
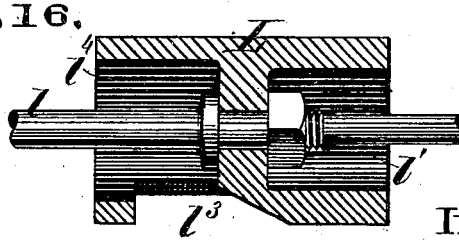
Attest.
Charles Pickles
O. T. Thielens
Inventors.
Albert F. Vallotton
Henry Leguay
by Chas. D. Moody
atty.

UNITED STATES PATENT OFFICE.

ALBERT F. VALLOTTON AND HENRY LEGUAY, OF ST. LOUIS, MISSOURI.

STEAM-ENGINE.

SPECIFICATION forming part of Letters Patent No. 258,617, dated May 30, 1882.

Application filed August 25, 1879. Renewed September 30, 1881. (Model.)

*To all whom it may concern:*

Be it known that we, ALBERT F. VALLOTTON and HENRY LEGUAY, residents of St. Louis, Missouri, have jointly made a new and useful Improvement in Steam-Engines, of which the following is a full, clear, and exact description, reference being had to the annexed drawings, making part of this specification, in which—

Figure 1:
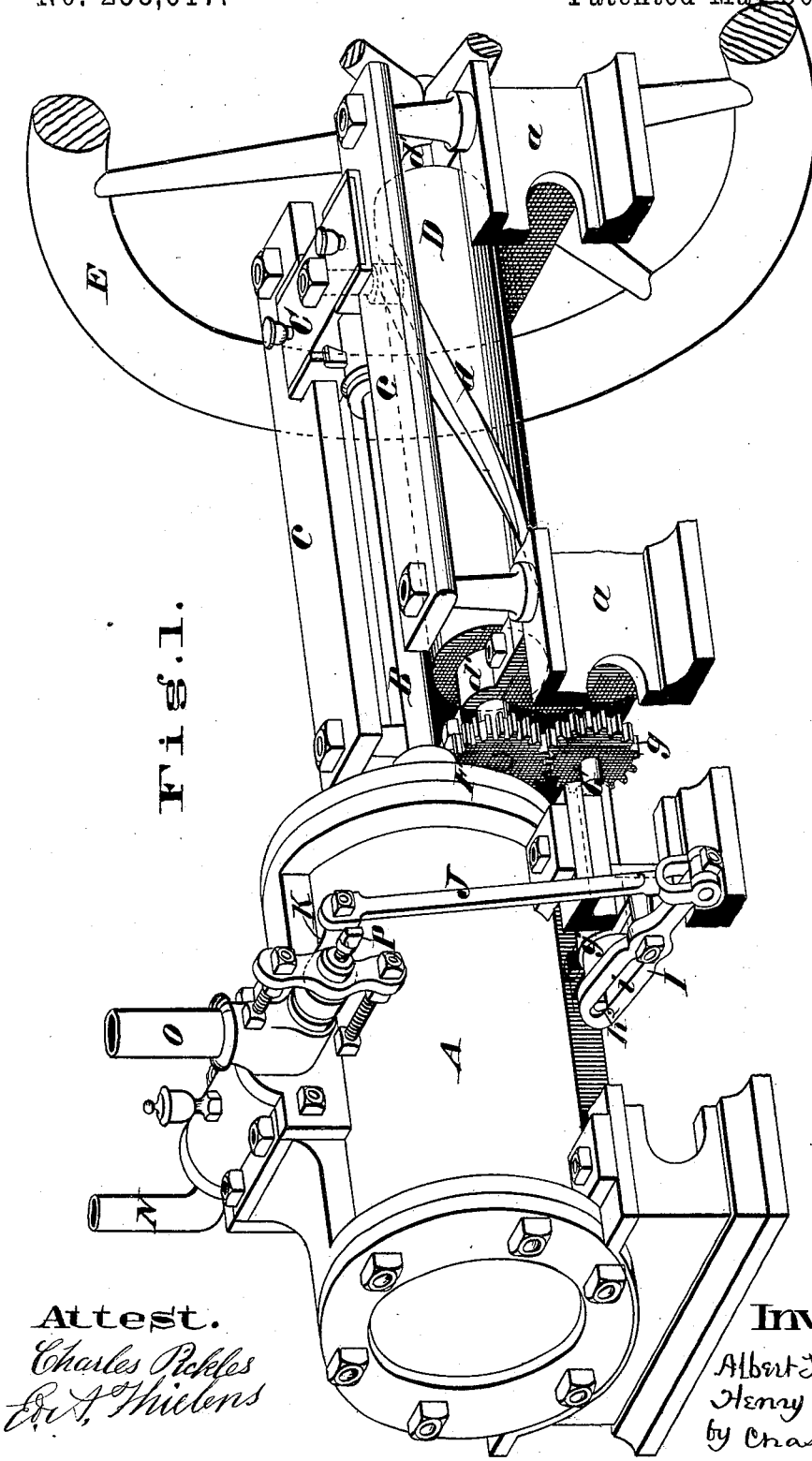
Figure 2:
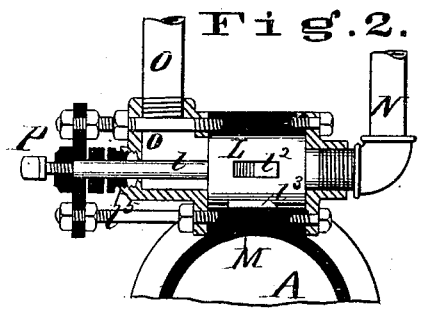
Figure 3:
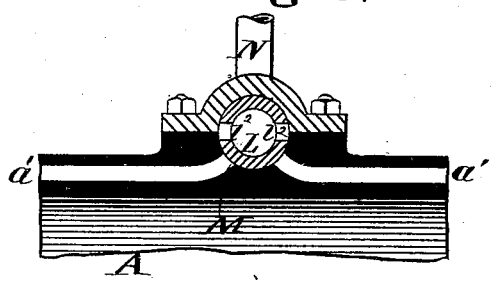
Figure 5:
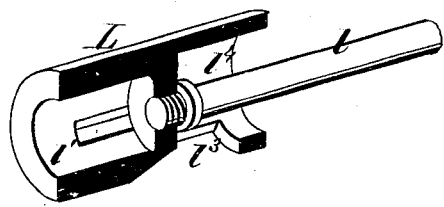
Figure 4:
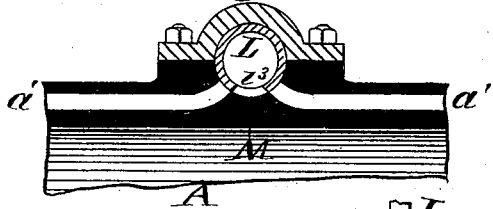
Figure 6:
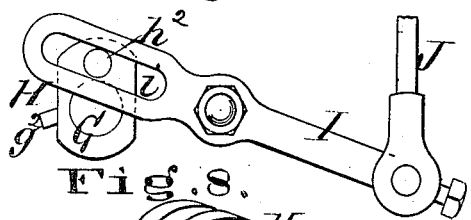
Figure 7:
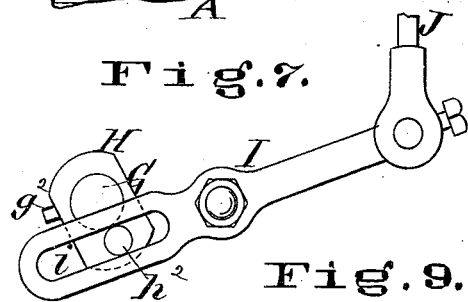
Figure 8:
Figure 9:
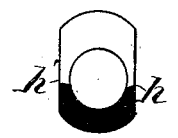
Figure 10:
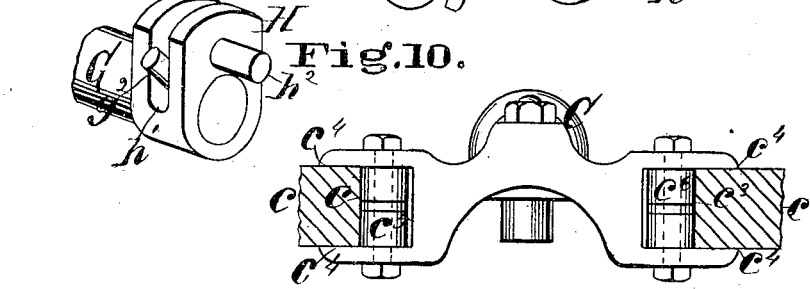
Figure 11:
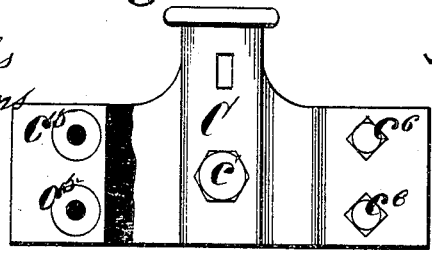

Figure 1 is a view in perspective of the improved engine, a portion being broken away to show the interior construction; Figs. 2, 3, 4, 5, details, and being respectively as follows: a view showing the valve, valve-chest, and parts immediately therewith connected, and being taken partly in section and partly in elevation; a cross-section on the line of the inlet-ports; another cross-section on the line of the exhaust-port, and a sectional perspective of the valve; Figs. 6, 7, 8, 9, details, being views of that part of the valve-gear immediately connected with the shifting mechanism; Figs. 10, 11, respectively a cross-section and a plan (the latter partly in section) of the the cross-head; Fig. 12, a side sectional elevation of the cylinder; Fig. 13, a cross-section of the latter; Fig. 14, an elevation of the stud that connects the cross-head and cylinder, the roller on the stud being shown in section; Fig. 15, a longitudinal section taken through the valve-chamber, showing the mode of supporting the valve; and Fig. 16 a, longitudinal section of the valve.

The same letters denote the same parts.

A primary object of the present invention is to provide an improved means by which the ordinary pitman, crank, and crank-shaft are dispensed with and the reciprocating motion of the piston-rod converted directly into rotary motion. It also has relation to the construction of the valve, the valve-shifting mechanism, and the valve-gear as an entirety, enabling the ordinary eccentric to be dispensed with; also, to the general combination of all the various parts of the engine, substantially as hereinafter described.

Referring to the drawings, A represents the engine-cylinder. It may be of any approved design consistent with the present improvements.

B represents the piston-rod, and C the cross-head, the latter working in the slides $c$ $c$. Instead of the usual connecting-rod leading from the cross-head, the latter is furnished with a stud, $c'$. (Shown in Figs. 1, 10, 11, 14.) This stud engages and is made to move in a groove, $d$, in a cylinder, D, Figs. 1, 12, 13, that is arranged parallel with the sides $c$ $c$, and to turn in bearings $d'$ $d'$ in the engine-frame $a$. The groove $d$ winds around the cylinder D in the manner shown, and the effect of the movement of the stud along the groove is to cause the cylinder to rotate in its bearings $d'$ $d'$. To insure the proper working of the stud in the cylinder the latter is furnished with a fly-wheel, E, and to relieve the friction in its movement in the groove the stud $c'$ is provided with a roller, $c^2$. The wear, however, upon the sides of the groove in the cylinder is necessarily considerable, and it is essential for the proper working of the parts that provision be made for taking it up and maintaining the groove in its original position. Accordingly the cylinder is made in two similar parts, $d^4$ $d^4$, which parts are fastened to a center, $d^2$, by means of screws $d^3$. The openings in the parts $d^4$ $d^4$, through which the cylinders pass, are elongated. (The elongation not shown in model.) Now, as the parts $d^4$ $d^4$ become worn along the edge of the groove $d$ they can, by loosening the screws, be moved upon the center and brought nearer each other, and then, when properly relatively adjusted, be fastened in place by tightening the screws. In this manner the groove can be maintained in the same place in the cylinder and in its original width. At its inner end the cylinder is provided with a pinion, F, which rotates with the cylinder. The pinion engages with a gear-wheel, $g$, that is fastened to a shaft, G. The latter is held in suitable bearings, $g'$ $g'$. This shaft is furnished with a pin, $g^2$, which projects at right angles from the shaft.

H represents an arm or crank that is attached loosely to the shaft G, but is made to move around with it in consequence of the pin $g^2$ coming against one or the other (according to the direction of the rotation) of two shoulders, $h$ $h'$, with which the crank is provided—that is, the shaft G turns until the stud $g^2$ encounters one of the shoulders $h$ $h'$, whereupon the crank is carried around with the shaft. The aim of this feature of the crank H will be hereinafter described. The crank H is furnished with a wrist-pin, $h^2$, which engages in a slot, $i$, of the slotted lever I. This last-named part, in turn, and by means of the rod J and arm K, is connected with the stem $l$ of the valve L. The latter is cylindrical in form, and has a reciprocating rotary movement in the valve-seat M. The valve, at that end which is toward the supply-pipe, has a chamber, $l'$, in which the steam is received from the supply-pipe N.

$l^2$ $l^2$ represent the ports leading from the chamber $l'$, and connecting in the usual manner as the valve moves with the steam-passages $a'$ $a'$ in the cylinder. $l^3$ represents the exhaust-port, leading in through the side of the valve and connecting with an annular space, $l^4$, around the valve-stem, and thence with a space, $o$, leading to the exhaust-pipe O. The valve-stem projects from both ends of the valve, and is held in bearings $l^5$ $l^5$. The valve is adjusted longitudinally in place by means of a set-screw, P.

The operation of the invention is as follows: As the cross-head moves upon the slides $c$ $c$ the stud $c'$ traverses the groove $d$ in the cylinder D, causing the latter to rotate in its bearings, and thereby obtaining the desired rotary movement without the use of any intervening part. By means of the fly-wheel E the motion is rendered continuous and the proper movement of the stud in the cylinder insured. Motion can be taken off from the cylinder in the usual manner. The motion of the cylinder is also, through the gears F $g$, imparted to the shaft G, and ultimately through the valve-gear above described to the valve L, causing the latter to operate. To reverse the valve the crank H is by any suitable lever or other means (not shown) turned around upon the shaft G, so as to bring the opposite one of the shoulders in contact with the stud $g^2$—that is, if the shoulder $h$ has been against the stud the crank must be turned to bring the shoulder $h'$ against it, and vice versa. This shifting of the crank H causes the pin $h^2$ to move the lever I sufficiently to shift the valve and cause the cylinder to rotate in the opposite direction. The working of the valve is made easy, for the only unbalanced steam-pressure thereon is in the direction of the screw P, or at right angles to the valve-seat. The valve also, by being held in the two bearings $l^5$ $l^5$, works very steadily. A cut-off can be arranged within the chamber $l'$ of the valve.

It is obvious that in use a lateral strain has to be sustained by the slides $c$ $c$. To meet this properly and to resist any torsional strain upon the cross-head, it is desirable for the slides $c$ $c$ to be made with bearings $c^3$ $c^3$ extended in a vertical direction, and the parts should be so relatively adjusted that a line drawn horizontally midway between the top and bottom edges, $c^4$ $c^4$, of the bearings $c^3$ $c^3$ should pass through the point where the stud $c'$ bears against the groove $d$ in the cylinder. The cross-head is furnished with friction-rollers $c^5$ $c^6$, which bear against the slides, and especially against the edges $c^4$ $c^4$ thereof.

We claim—

1. The cylinder D, having the center $d^2$ and the adjustable parts $d^4$ $d^4$, as and for the purpose described.

2. The combination of the slides $c$ $c$, the cross-head C, stud $c'$, and the cylinder D, having the adjustable parts $d^4$ $d^4$, substantially as described.

3. The combination of the slides $c$ $c$, having the extended bearings $c^3$ $c^3$, the cross-head C, stud $c'$, and the cylinder D, having the groove $d$, the said parts being relatively adjusted as and for the purposes set forth.

4. The combination of the slides $c$ $c$, having the extended bearings $c^3$ $c^3$, and the cross-head C, having the rollers $c^5$ $c^6$ and the stud $c'$, and the cylinder D, substantially as described.

5. The combination of the cylinder D, pinion F, gear $g$, shaft G, pin $g^2$, crank H, pin $h^2$, slotted lever I, rod J, arm K, and valve L, substantially as described.

6. The combination of the shaft G, crank H, having the shoulders $h$ $h'$ and pin $h^2$, and the slotted lever I, as and for the purpose set forth.

7. The combination of the valve L, slides $c$ $c$, having the extended bearings $c^3$ $c^3$, seat M, stem $l$, and screw P, substantially as described.

Witness our hands.

ALBERT F. VALLOTTON.
HENRY LEGUAY.

Witnesses:
CHAS. D. MOODY,
CHARLES PICKLES.